United States Patent [19]

Hertrich et al.

[11] Patent Number: 4,969,858
[45] Date of Patent: Nov. 13, 1990

[54] TENSIONING DEVICE FOR BELTS

[75] Inventors: Steffen Hertrich, Herzogenaurach; Dieter Goppelt, Aurachtal, both of Fed. Rep. of Germany

[73] Assignee: INA Walzlager Schaeffler KG, Herzogenaurach, Fed. Rep. of Germany

[21] Appl. No.: 423,990

[22] Filed: Oct. 19, 1989

[30] Foreign Application Priority Data

Oct. 29, 1988 [DE] Fed. Rep. of Germany ....... 3836933

[51] Int. Cl.$^5$ .............................................. F16H 7/08
[52] U.S. Cl. ...................................... 474/135; 474/117
[58] Field of Search ...................... 474/101, 109–111, 474/113–117, 133, 135, 136, 138

[56] References Cited

U.S. PATENT DOCUMENTS

| 4,713,044 | 12/1987 | Nakamura et al. | 474/135 |
|---|---|---|---|
| 4,741,299 | 5/1988 | Matsuura et al. | 474/110 X |
| 4,790,796 | 12/1988 | Okabe et al. | 474/110 |
| 4,790,801 | 12/1988 | Schmidt et al. | 474/110 |
| 4,798,563 | 1/1989 | Okabe et al. | 474/110 |
| 4,904,230 | 2/1990 | Kawashima et al. | 474/135 X |

Primary Examiner—Thuy M. Bui
Attorney, Agent, or Firm—Bierman and Muserlian

[57] ABSTRACT

A tensioning device for belts, chains and the like, particularly for the camshaft drive of an internal combustion engine, the device comprising a tension pulley mounted on a movable carrier and a control element by which, when heating occurs, the carrier can be moved by an actuating member in the slackening direction of the belt against the action of a pressure spring, the control element comprising a hollow cylindrical sleeve and a pressure piston arranged therein for longitudinal displacement on whose part lying outside the sleeve a pressure member with a slanting contact surface forming an acute angle with the piston axis is fitted, the contact surface being in contact with a corresponding contact surface of the carrier of the tension pulley for increasing the working reliability of the control element so that automatic adjustment of a defined belt pretension is effected during operation.

2 Claims, 2 Drawing Sheets

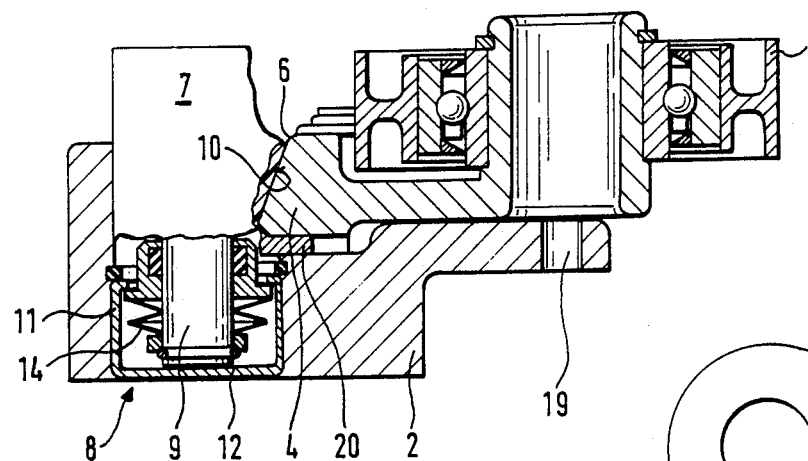
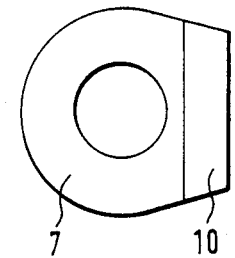
Fig. 2
Fig. 4
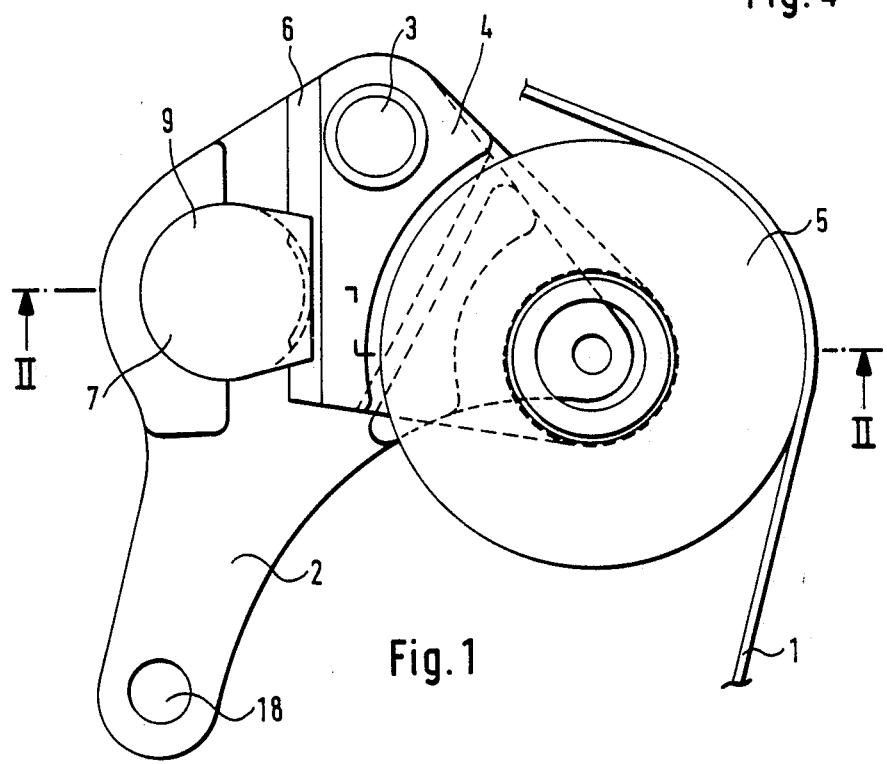
Fig. 1

TENSIONING DEVICE FOR BELTS

STATE OF THE ART

Tensioning devices for belts, chains or the like, in particular for the camshaft drive of an internal combustion engine, the device comprising a tension pulley mounted on a movable carrier and a control element by which, when heating occurs the carrier can be moved via an actuating member in the slackening direction of the belt against the action of a pressure spring, the control element comprising a hollow cylindrical sleeve and, arranged in this for longitudinal displacement, a pressure piston, on whose part lying outside the sleeve a pressure member with a slanting contact surface forming an acute angle with the piston axis is fitted, this contact surface being in contact with a corresponding contact surface of the carrier of the tension pulley are described in German Patent Application No. P 38 17 478.2. However, such a tensioning device does not, for example, enable pre-tension decreases of the belt caused by belt elongations resulting from longer operation periods to be compensated.

OBJECTS OF THE INVENTION

It is an object of the invention to further develop the tensioning device for increasing the working reliability of the control element so that an automatic adjustment of a defined belt pre-tension is effected during operation. In doing this, it is also intended to exclude the influence of belt elongations which occur during the operational life of the belt.

This and other objects and advantages of the invention will become obvious from the following detailed description.

THE INVENTION

The tensioning device of the invention for belts, chains and the like, particularly for the camshaft drive of an internal combustion engine, the device comprising a tension pulley mounted on a movable carrier and a control element by which, when heating occurs, the carrier can be moved by an actuating member in the slackening direction of the belt against the action of a pressure spring, the control element comprising a hollow cylindrical sleeve and a pressure piston arranged therein for longitudinal displacement on whose part lying outside the sleeve a pressure member with a slanting contact surface forming an acute angle with the piston axis is fitted, the contact surface being in contact with a corresponding contact surface of the carrier of the tension pulley is characterized in that the pressure piston is designed as a tube, one end of which opens into the receiving space of the sleeve and the other end into a reservoir of the pressure member provided with an air vent where the pressure piston is connected with the pressure member in the axial direction via a second pressure spring which with its end directed towards the sleeve bears against the pressure member and with its other end against the pressure piston, within the reservoir the pressure piston which is axially displaceable relative to the pressure member, has a retaining ring which can be made to bear against the pressure member to limit the displaceability of the pressure piston with respect to the sleeve, a one-way valve with a valve seat facing the sleeve and a spring-loaded valve body is arranged in the tubular pressure piston against whose side turned away from the sleeve a thrust pin fixed to the pressure member can be made to bear, an axially displaceable and sealed free flight piston is arranged in the tubular pressure piston between its end towards the sleeve and the one-way valve and at the control element the second pressure spring has a smaller spring force than the first pressure spring.

In this construction, the second pressure spring produces a constant pre-tension in the belt and it is possible to use the effect of a pressure fluid e.g. a hydraulic oil, with which the control element has to be filled upto inside the reservoir of the pressure member for the temperature-independent retensioning of the belt when its tension decreases. The free flight piston separates the non-variable quantity of hydraulic oil required for the thermal adjustment of the belt tension and contained in the sleeve and in the part of the pressure piston lying towards the sleeve, from the rest of the fluid contained in the control element. This latter quantity varies when the one-way valve is opened for the temperature-independent tension adjustment.

When the pressure member is displaced along the pressure piston by the action of the second pressure spring, the thrust pin effects the opening of the one-way valve. The valve body is preferably a ball covered by a cap and pressed against the seat by a valve spring bearing against the cap which is provided with a passage for the pressure fluid.

An example of one embodiment of the invention is represented in the drawings and described below in more detail.

FIG. 1 is a top view of a tensioning device of the invention;

FIG. 2 is a partial section across the tensioning device along the line II—II of FIG. 1;

FIG. 4 is a bottom view of the pressure member.

DESCRIPTION OF THE PREFERRED EMBODIMENTS

Figure 3:
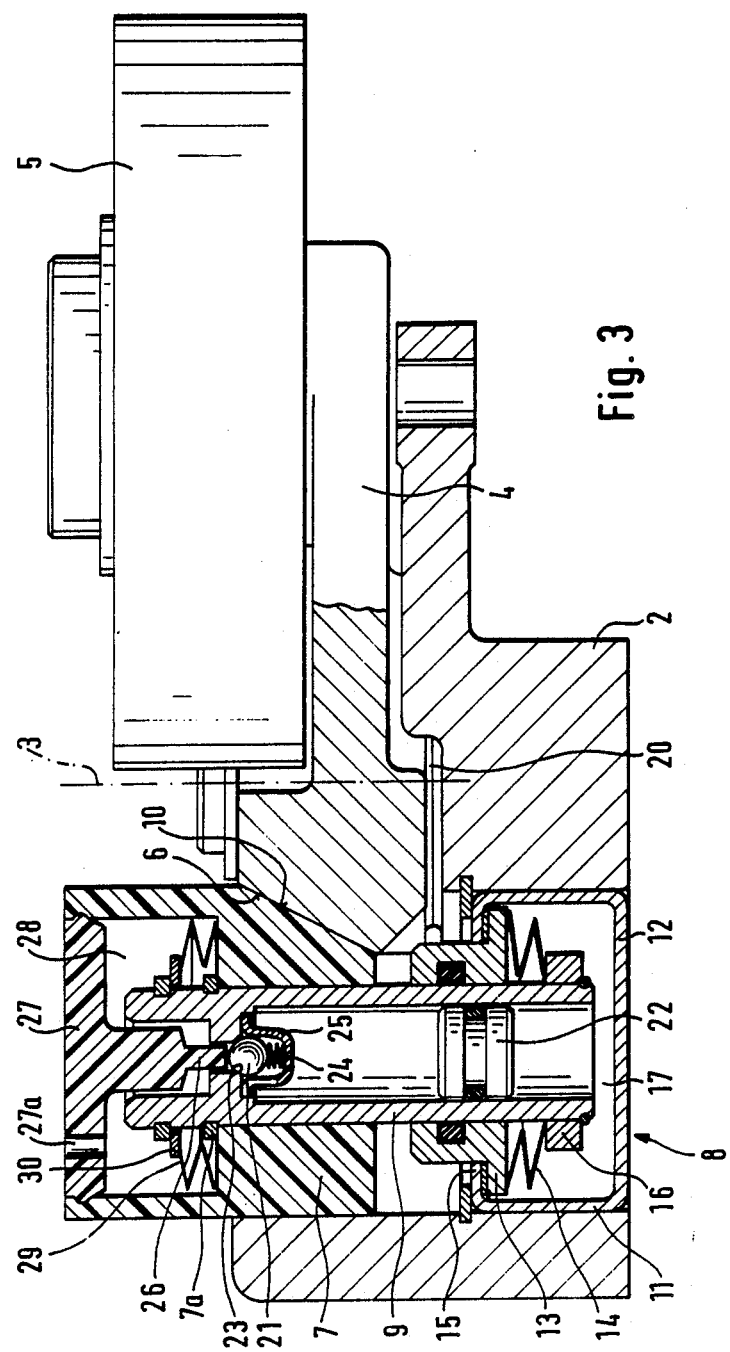
FIG. 3 is a complete section across the control element of the tensioning device of FIG. 2 but on an enlarged scale.

A tensioning device of the invention for the belt 1 of a camshaft drive of an internal combustion engine has a mounting plate 2 which can be fixed to the engine. A swivelling lever 4 mounted on the plate 2 about a fixed swivelling axis 3 serves as a carrier for a tensioning pulley 5 which is located at the swivelling lever 4 with an axis parallel to the swivelling axis 3 and on which the belt 1 is tensioned. The swivelling lever 4 is in contact via a slanting contact surface 6 with a pressure member 7 which is part of a control element 8 for the swivelling of the tensioning pulley 5. The pressure member 7 is fitted with its bore on a pressure piston 9 of the control element. It can turn about the circular cylindrical pressure piston 9 and the longitudinal axis of the pressure piston 9 runs parallel to the swivelling axis 3. The pressure member 7 has an even contact surface 10 which is intended for surface contact with the contact surface 6 of the swivelling lever 4. Both contact surfaces, 6 and 10, form an acute angle with the axis of the pressure piston 9.

The control element 8 is designed as a hydraulic cylinder with a sleeve 11 which is fixed in a bore in the mounting plate 2. The sleeve 11 is closed at one end by a bottom 12 whereas at the other end, the pressure piston 9 projects into the sleeve. This piston is retained, longitudinally displaceable and sealed, in a supporting ring 13 whose flange situated in the sleeve 11 is pressed by a pressure spring 14 against a radially inwards directed flange formed by a bent over rim 15 of the sleeve 11. The pressure spring 14 is designed as a disk spring and surrounds the pressure piston 9 inside the sleeve 11. With its end away from the supporting ring 13, the pressure spring 14 bears against a retaining ring 16 which bears against the pressure piston 9. The free volume of the receiving spring 17 of the sleeve 11 is completely filled with a gas-free pressure fluid e.g. a hydraulic oil.

When employed with an internal combustion engine, the pressure fluid in the sleeve 11 expands on heating and displaces the pressure piston 9 slightly out of the sleeve 11 against the action of the pressure spring 14. At the same time, the pressure member 7 which, in one direction bears axially against a retaining ring 7a of the pressure piston 9, is released from this retaining ring and can be displaced with the pressure piston in the axial direction of the latter. Due to the tension of the belt 1, the contact surface 6 of the swivelling lever 4 follows the contact surface 10 of the pressure member 7. During this process, the swivelling lever 4 which carries the tensioning pulley 5 swivels about the axis 3 with the result that the pressure member 7 has to turn about the axis of the pressure piston 9 so that the contact surface 6 of the swivelling lever 4 and the contact surface 10 of the pressure member 7 can remain in contact. The tension of the belt 1 which increases with rising temperature is compensated again by the tensioning device, that is to say, by the displacement of the pressure member and the releasing of the tensioning pulley lever.

On cooling, the volume of the pressure fluid contained in the sleeve 11 decreases so that the pressure spring 14 now moves the pressure piston 9 back into the sleeve 11. At the same time, the swivelling lever 4 is swivelled back via the contact surfaces 6 and 10 in the tensioning direction of the belt 1.

The tensioning device can be fixed in a simple manner directly to the engine block of an internal combustion engine through the mounting plate 2 with the help of mounting bores 18 and 19. The swivelling lever 4, on which the pressure member 7 acts via the contact surface 6 with a horizontal and a vertical force component in every position, bears against the mounting plate 2, at which it is swivellably mounted, via an adjusting washer 20. This washer is provided to reduce sliding friction and wear between the swivelling lever and the mounted plate 2.

FIG. 3 shows that the pressure piston 9 is designed as a tube which at one end opens into the sleeve 11 and contains a one-way valve with a ball 21. Besides this, a free flight piston 22 is located in the pressure piston 9 between the end situated in the sleeve 11 and the one-way valve, and is displaceable along the bore of the pressure piston 9 and sealed against the inner surface of the pressure piston 9. In the pressure piston 9, a valve seat 23 directed towards the free flight piston 22 is formed, against which the ball 21 forming the valve body bears where it is retained with the help of a valve spring 24, which with its end away from the ball 21 bears against a cap 25 surrounding the ball and comprising a passage for hydraulic oil. The circular ring-shaped valve seat 23 lies in the region of through axial bore of the part of the pressure piston 9 acting as the valve housing. A thrust pin 26 extends into this bore and can be made to bear against the side of the ball 21 away from the cap 25. The thrust pin is rigidly fixed to the pressure member 7 and is part of a sealing cap 27 for a reservoir 28 formed in the pressure member 7 for hydraulic oil, in which reservoir the end of the pressure piston 9 away from the sleeve 11 is also situated. The reservoir 28 communicates with the exterior through an air vent 27a in the sealing cap 27. In the reservoir 28, the pressure piston 9 is surrounded by a second pressure spring 29 which is in the form of a disk spring and bears against the pressure member 7 with its end directed towards the sleeve 11 and through a retaining ring 30 against the pressure piston 9 with its end directed towards the sealing cap 27.

The second pressure spring 29 is designed so that in the quiescent condition shown, in which the contact surface 10 of the pressure member 7 bears against the contact surface 6 of the swivelling lever 4, a basic radial force of, for instance, 50N corresponding to the pre-tension of the belt and produced by the second pressure spring 29, acts on the tensioning pulley 5 and its swivelling lever 4, the spring force of the pressure spring 14 situated in the sleeve 11 being larger than the spring force of the second pressure spring 29. In the quiescent condition shown, the retaining ring 7a of the pressure piston 9 bears against the pressure member 7 and the end face of the thrust pin bears against the ball 21, the valve not yet being opened. The pressure piston 9 is pressed axially into the sleeve 11 by the pressure spring 14. This force is counteracted by the compressive force of the incompressible fluid which is contained in the sleeve 11 and in the pressure piston 9 up to the valve 21, 23. In this condition therefore, the pressure piston 9 is held immobile at the mounting plate 2 by means of the sleeve 11.

When the pre-tension of the belt decreases, the force of reaction effective at the contact surface 10 against the force produced by the second pressure spring 29 and transmitted to the contact surface 6 also decreases and the swivelling lever 4 is swivelled slightly outwards by the pressure member 7. At this axial movement of the pressure member 7 which moves away from the retaining ring 7a, the thrust pin 26 presses against the ball 21 in the direction of the sleeve 11 so that the one-way valve is opened. The hydraulic fluid can now flow from the pressure piston 9 through the valve into the reservoir 28, so that the pressure piston 9 is no longer held immobile at the sleeve 11 and can be pushed farther into the sleeve 11 by the pressure spring 14. This movement is possible because the pressure spring 14 in the sleeve 11 is stronger than the counteracting pressure spring 29 in the pressure member 7.

This displacement of the pressure piston 9 is terminated when the retaining ring 7a once again bears against the pressure member 7 and the pressure spring 14 has simultaneously pulled the pressure piston 9 with the one-way valve so far into the sleeve 11 that the ball 21 is released from the thrust pin 26 and as a result of the action of the valve spring 24 can again bear against the valve seat 23. Now a new state of tension is established in which the basic radial force of 50N, produced by the second pressure spring 29 and in equilibrium with the pre-tension of the belt, is again effective.

The pressure spring 14 can pull the pressure piston 9 into the sleeve 11 only as long as the one-way valve is open. The force of the pressure spring 14 does of course also act when the one-way valve is closed; a pushing of the pressure piston 9 into the sleeve 11, however would be associated with a fluid volume reduction of the latter. The pressure fluid would tend to push the free flight piston 22 towards the one-way valve but this is not possible because the pressure fluid contained between the free fight piston 22 and the one-way valve cannot escape. Therefore, when the valve is closed, the pressure spring 14 does not develop any displacing action on the pressure piston 9.

The air vent 27a in the sealing cap 27 of the pressure member 7 is necessary for preventing overpressure from being built up in the reservoir 28 upon readjustment of the belt tension because this could lead to an untimely opening of the valve 21, 23. The reservoir 28 is partly filled with liquid and partly with air. At every adjusting process, a quantity of air corresponging to the volume of fluid admitted by the valve into the reservoir 28 exits from the reservoir through the air vent 27a and flows into the open.

The free flight piston 22 seals the space of the sleeve 11 and the pressure piston 9 containing the constant quantity of pressure fluid of the control element 8 necessary for the thermal tension adjustment of the belt. This space is situated in the immediate vicinity of the engine block of the internal combustion engine and gets heated and cooled with this. As opposed to this, the quantity of fluid contained in the pressure piston 9 between the free flight piston 22 and valve 21, 23 participates to a lesser extent in the temperature variations. Without the free flight piston, the hot pressure fluid at the bottom 12 would mix with the colder pressure fluid at the valve 21, 23 during operation, and during an adjusting process a part of the mixed fluid would escape through the valve into the reservoir 28 so that an exact adjustment of the belt tension would no longer be possible. The free flight piston 22 is therefore necessary for keeping the quantity of effective pressure fluid constant as well as for its thermal insulation.

In the delivery condition, the control element 8 can be secured with the help of a locking pin. The pressure spring 14 is then compressed to the block length. After the removal of the locking pin, the same process takes place as in the readjustment of the belt tension.

Various modifications of the device of the invention may be made without departing from the spirit or scope thereof and it should be understood that the invention is intended to be limited only as defined in the appended claims.

What is claim is:

1. A tensioning device for belts, chains and the like, particularly for the camshaft drive of an internal combustion engine, the device comprising a tension pulley mounted on a movable carrier and a control element by which, when heating occurs the carrier can be moved by an actuating member in the slackening direction of the belt against the action of a pressure spring, the control element comprising a hollow cylindrical sleeve and a pressure piston arranged therein for longitudinal displacement on whose part lying outside the sleeve a pressure member with a slanting contact surface forming an acute angle with the piston axis is fitted, the contact surface being in contact with a corresponding contact surface of the carrier of the tension pulley characterized in that the pressure piston is designed as a tube, one end of which opens into the receiving space of the sleeve and the other end into a reservoir of the pressure member provided with an air vent where the pressure piston is connected with the pressure member in the axial direction via a second pressure spring which with its end directed towards the sleeve bears against the pressure member and with its other end against the pressure piston, within the reservoir, the pressure piston which is axially displaceable relative to the pressure member, has a retaining ring which can be made to bear against the pressure member to limit the displaceability of the pressure piston with respect to the sleeve, a one-way valve with a valve seat facing the sleeve and a spring-loaded valve body is arranged in the tubular pressure piston against whose side turned away from the sleeve a thrust pin fixed to the pressure member can be made to bear, an axially displaceable and sealed free flight piston is arranged in the tubular pressure piston between its end towards the sleeve and the one-way valve and at the control element the second pressure spring has a smaller spring force than the first pressure spring.

2. The tensioning device of claim 1, characterized in that the valve body is a ball covered by a cap provided with a passage for the pressure fluid, the ball being pressed against the seat by a valve spring bearing against the cap.

* * * * *